United States Patent

[11] 3,610,382

| [72] | Inventor | Clifford Makinson |
| | | Rosemere, Quebec, Canada |
| [21] | Appl. No. | 869,490 |
| [22] | Filed | Oct. 27, 1969 |
| [45] | Patented | Oct. 5, 1971 |
| [73] | Assignee | The Scott & Fetzer Company |
| | | Cleveland, Ohio |

[54] CENTRIFUGAL CLUTCH
9 Claims, 5 Drawing Figs.
[52] U.S. Cl. .................................................. 192/105BA,
192/76
[51] Int. Cl. .................................................. F16d 43/14
[50] Field of Search........................................ 192/105
BA, 103 B, 76

[56] References Cited
UNITED STATES PATENTS

| 1,197,895 | 9/1916 | Bendl | 192/105 BA |
| 2,452,111 | 10/1948 | Eaton | 192/105 BA |
| 2,564,826 | 8/1951 | Yoder | 192/105 BA |
| 2,778,469 | 1/1957 | McIntyre | 192/105 BA |
| 3,367,465 | 2/1968 | Newman | 192/105 BA |

Primary Examiner—Benjamin W. Wyche
Attorney—Allen D. Gutchess, Jr.

ABSTRACT: A centrifugal clutch particularly for a chain saw is provided. The clutch is made of two sintered centrifugal elements normally urged together by coil springs which are under compression when in a static condition and are further compressed as the clutch elements move outwardly under centrifugal force. By functioning in compression, the springs last longer and the engagement of the clutch is smoother.

PATENTED OCT 5 1971 3,610,382
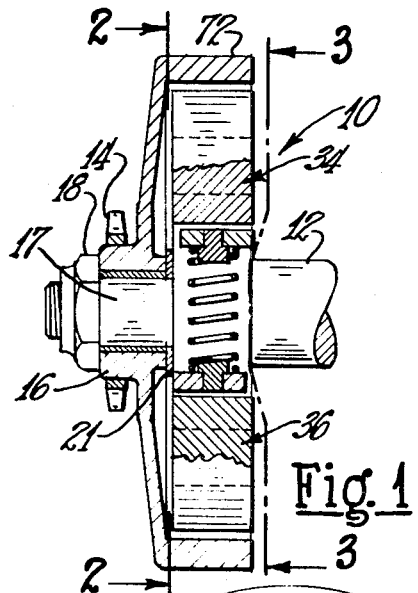
Fig. 1
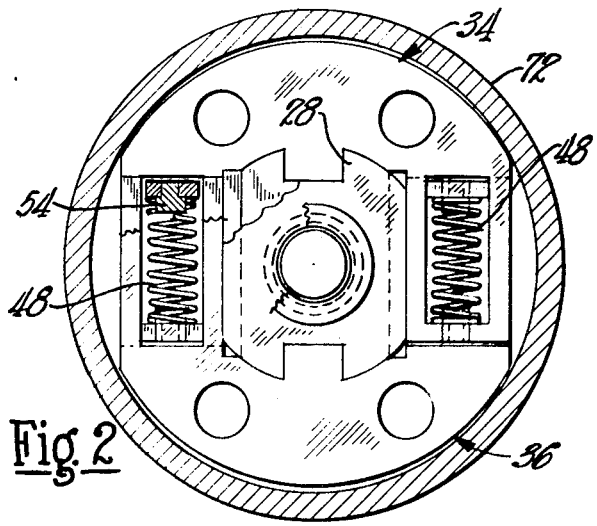
Fig. 2
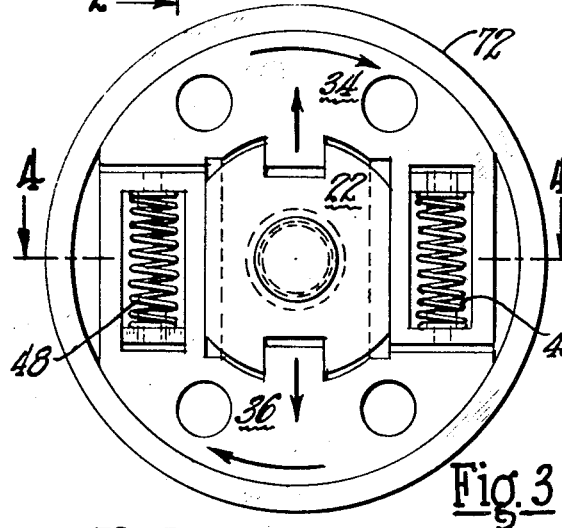
Fig. 3
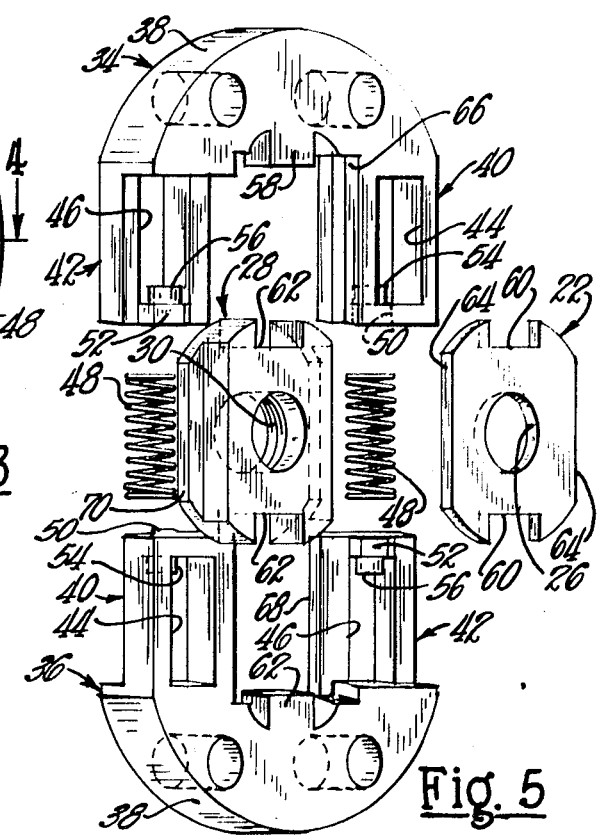
Fig. 4
Fig. 5
INVENTOR.
CLIFFORD MAKINSON
BY
Allen D. Gutchess jr
ATTORNEY

CENTRIFUGAL CLUTCH

This invention relates to a centrifugal clutch and more particularly to a centrifugally actuated friction clutch for chain saws.

Many types of centrifugal clutches are known in the art. Some of these clutches have a tendency when connecting or disconnecting drive and driven members to tend to engage and disengage in an abrupt manner. Also, the operation of the clutches is often somewhat erratic the speeds at which they engage and disengage not being consistent. Further, such clutches have the clutch elements held in the disengaged position by tension springs which lack uniformity in operation and also fail with undesirable frequency.

The new centrifugal clutch employs two clutch shoe elements which are identical or substantially identical and are uniquely designed to hold a pair of springs in compression under static conditions, with the springs further compressed as the shoe elements move outwardly under centrifugal force. Engagement and disengagement of the shoe elements are smooth and also occur at consistent speeds. The shoe elements are preferably made of sintered metal to provide effective, long wearing components. Further, the unique design minimizes the number of components required and also results in increased reliability.

It is, therefore, a principal object of the invention to provide a centrifugal clutch in which the springs are maintained under compression.

Another object of the invention is to provide a chain saw clutch having the advantages and improvements outlined above.

Other objects and advantages of the invention will be apparent from the following detailed description of a preferred embodiment thereof, reference being made to the accompanying drawings, in which:

FIG. 1 is a side view, primarily in vertical cross section, of a centrifugal clutch embodying the invention and incorporated in a drive train of a chain saw;

FIG. 2 is a view in transverse section, taken along the line 2—of FIG. 1;

FIG. 3 is a view in elevation taken along the line 3—3 of FIG. 1;

FIG. 4 is a view in horizontal cross section taken along the line 4—4 of FIG. 3; and FIG. 5 is an exploded view in perspective of the components of the clutch.

Referring to FIGS. 1 and 4, a clutch embodying the invention is indicated at 10 and is used to effect engagement and disengagement between a drive shaft 12 and a driven element or sprocket 14 which drives a saw chain (not shown) or other suitable element. The sprocket 14 is on a hub 16 rotatably carried on an outer portion 17 of the shaft 12 and retained by a nut 18, while the clutch 10 is mounted on a slightly enlarged portion 20 of the shaft 12 with a washer 21 therebetween. A rear retainer plate 22 of the clutch abuts a shoulder 24 on the shaft 12, having an opening 26 through which the portion 20 of the shaft is received. A threaded hub member 28 retains the clutch 10 on the enlarged shaft portion 20, having internal threads 30 engaged on the shaft threads 32. The hub member 28 is turned onto the shaft until it abuts the plate 22.

A pair of clutch shoe elements 34 and 36, according to the invention, are mounted on the guide plate 22 and the hub 28 and rotate with the shaft 12. Even with the hub 28 fully tightened on the shaft against the plate 22, the elements 34 and 36 are free to move radially with respect to the shaft. As shown, the clutch shoe elements 34 and 36 are substantially identical. Each includes arcuate shoes 38 and legs 40 and 42 which extend toward the opposite shoe element and are positioned such that the leg 40 of one shoe element lies adjacent the leg 42 of the other shoe element when the elements are in assembled relationship. The legs 40 and 42 have elongate openings 44 and 46 which define spaces for compression springs 48. The ends of the legs 40 and 42 have projecting flanges 50 and 52 having retaining projections or seats 54 and 56 received in and holding the ends of the springs 48. When so positioned, the springs are entirely within the adjacent openings 44 and 46.

Intermediate portions of the shoes 38 have tangs 58 between the legs 40 and 42 which are received in notches 60 of the plate 22 and in notches 62 of the hub member 28. This provides direct mechanical engagement through the plate 22 and the hub member 28 from the shaft 12 to the shoes 38. In addition, longitudinal edges 64 of the plate 22 are received in grooves or elongate recesses 66 and 68 formed in the legs 40 and 42. The hub member 28 also has longitudinally extending edge flanges 70 received in the other ones of the grooves or recesses 66 and 68. The plate 22 and the hub 28 thereby cooperate with the leg 40 and 42 of the clutch elements 34 and 36 to guide the elements in their inward and outward movements.

The clutch elements 34 and 36 are preferably identical to reduce manufacturing costs. Further, the elements preferably are made entirely of sintered metal, except for the steel projections 54 and 56. The hub 28 also can be of sintered metal although the plate 22 is of steel. As shown in FIG. 6, the entire clutch is made of only six separate parts.

The operation of the clutch 10 will be obvious from the above description but will be discussed briefly. As the shaft 12 is rotated, the hub member 28, threaded thereon, rotates and accordingly drives the shoe elements 34 and 36 primarily through the driving relationship between the notches 62 and the tangs 58. As the speed increases, the weight of the shoes 38 causes them to move radially outwardly, guided by the hub member 28 and the plate 22, until they engage the inner surface of a drum 72 which is integral with the sprocket hub 16. During this movement, the springs 48 are compressed further as the flanges 50 and 52 move toward one another. As the centrifugal force decreases, the springs again cause the shoes 38 to move toward one another and disengage the drum 72, thereby disengaging the sprocket 14 and the chain from the drive train. The compression of the springs achieved by this design provides more uniform and reliable operation for the clutch and more maintenance-free and longer life for the clutch elements.

Various modifications of the above-described embodiment of the invention will be apparent to those skilled in the art and it is to be understood that such modifications can be made without departing from the scope of the invention, the embodiment shown and described being primarily for purposes of illustration and not limitation.

I claim:

1. A centrifugal clutch comprising hub means engageable with a drive shaft, two generally U-shaped clutch shoe elements, each including clutch shoes with arcuate outer surfaces and two spaced, depending legs, each of said legs of one of said elements being positioned beside one of said legs of the other of said elements, two compression springs, each of said legs having an elongate opening therein aligned with an opening in the adjacent leg, with the adjacent openings defining spaces in which said compression springs are located, end portions of said legs being engaged with end portions of said springs to compress said springs when said clutch elements move outwardly away from one another.

2. A centrifugal clutch according to claim 1 characterized by said legs having flanges at the ends of said openings engageable with the ends of said springs, said flanges being the end portions of said legs which are engaged with the end portions of said springs.

3. A centrifugal clutch according to claim 1 characterized by said clutch shoe elements being substantially identical.

4. A centrifugal clutch comprising two generally U-shaped clutch shoe elements, each of said shoe elements having two spaced, depending legs, each of said legs of one of said elements being positioned beside one of said legs of the other said elements, with the adjacent legs being substantially identical to one another, an end portion of each of said legs having a flange extending toward the adjacent leg, two compression springs, said flanges of said legs being engaged with end portions of said springs to compress said springs when said clutch elements move outwardly away from one another.

5. A centrifugal clutch according to claim 4 characterized by each of said legs having an elongate opening therein aligned with an opening in the adjacent leg, with the adjacent openings defining spaces in which said compression springs are located.

6. A centrifugal clutch according to claim 5 characterized by said flanges of said legs being located at ends of said elongate openings.

7. A centrifugal clutch according to claim 4 characterized further by said legs of each of said shoe elements being substantially identical to each other, with the flanges at the end portions thereof facing in opposite directions.

8. A centrifugal clutch according to claim 4 characterized by hub means for engaging a drive shaft, said clutch shoe elements being mounted on said hub means and movable inwardly and outwardly with respect to said hub means, said hub means and said clutch shoe elements having cooperating edge and groove means for guiding said elements in their inward and outward movements relative to one another.

9. A centrifugal clutch according to claim 8 characterized by said clutch shoe elements and said hub means having cooperating notches and tangs to provide mechanical engagement therebetween.